Dec. 10, 1929. L. W. BUGBEE, JR 1,738,866
PROCESS OF MAKING MULTIFOCAL LENSES
Filed March 17, 1927 2 Sheets-Sheet 1
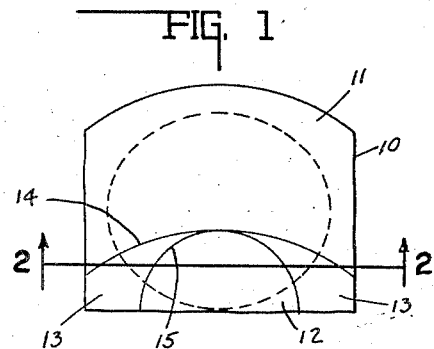
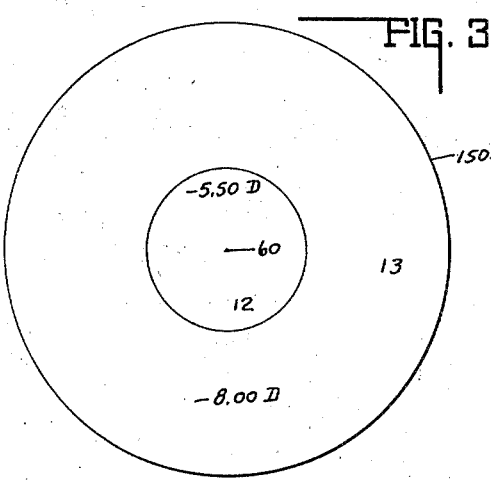
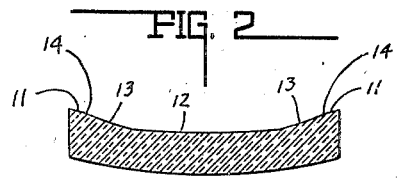
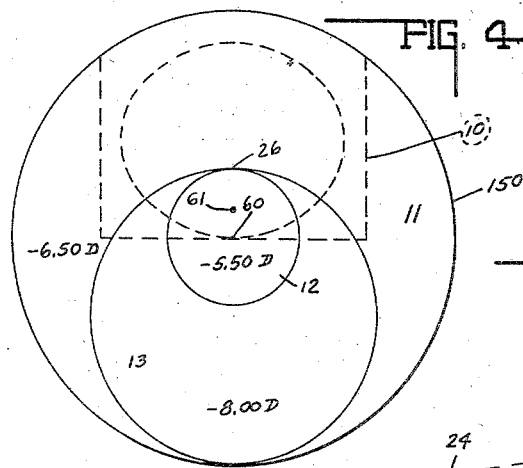
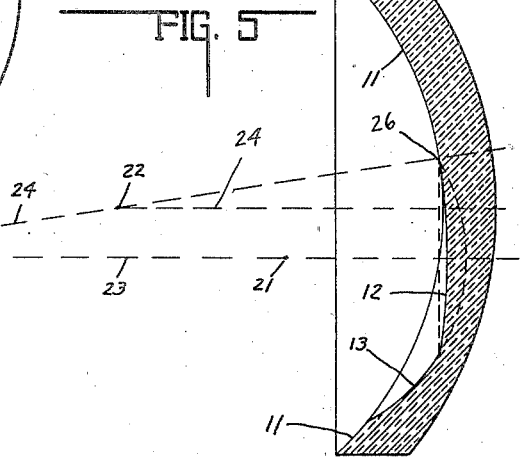
INVENTOR.
LUCIAN W. BUGBEE, JR.
BY
ATTORNEYS.

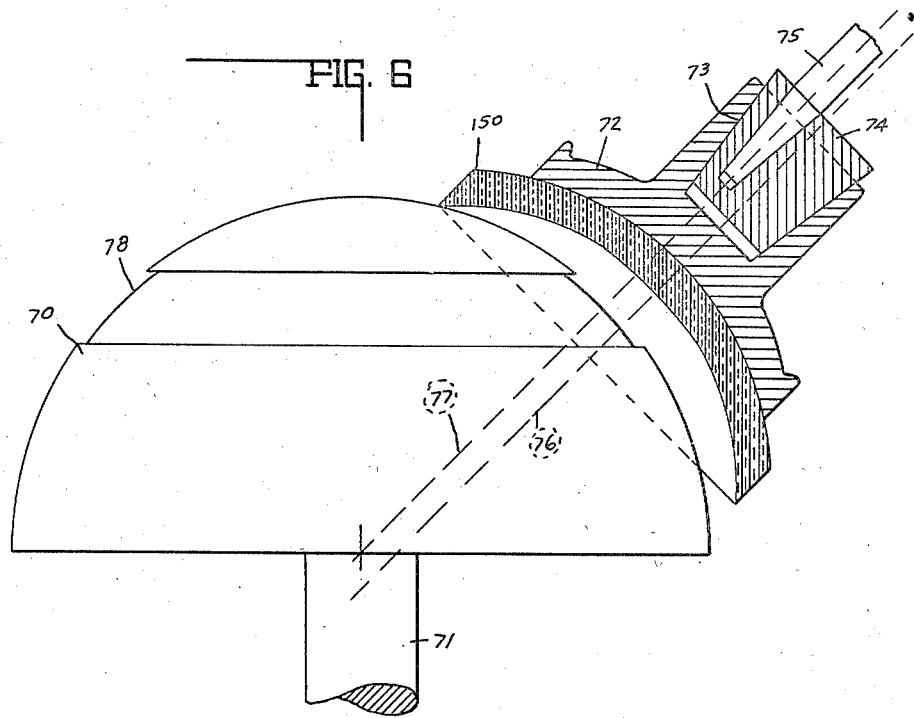
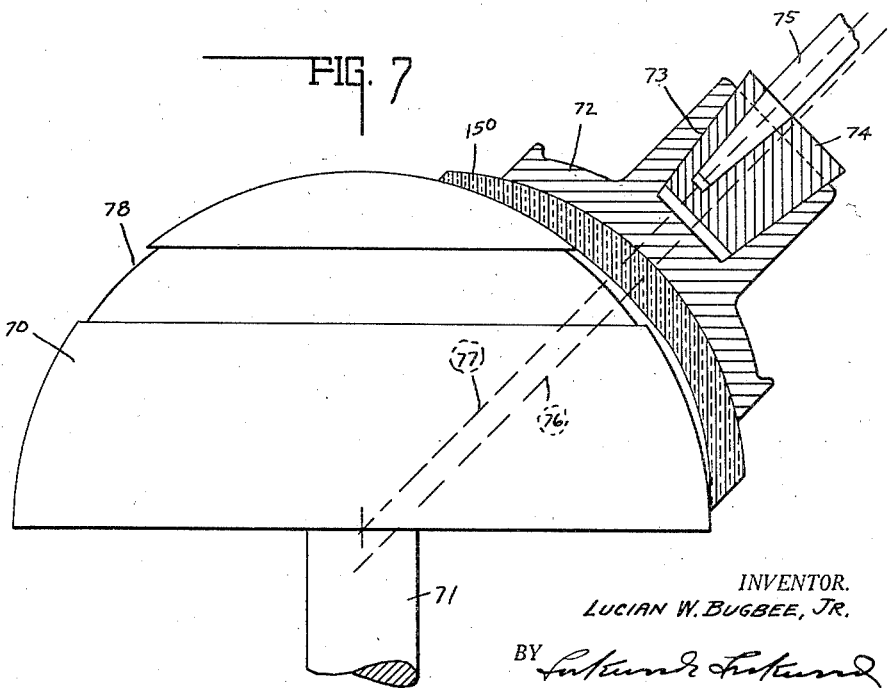

Patented Dec. 10, 1929

1,738,866

UNITED STATES PATENT OFFICE

LUCIAN W. BUGBEE, JR., OF INDIANAPOLIS, INDIANA, ASSIGNOR, BY MESNE ASSIGNMENTS, TO GEORGE C. FORREY, JR., OF INDIANAPOLIS, INDIANA

PROCESS OF MAKING MULTIFOCAL LENSES

Application filed March 17, 1927. Serial No. 175,974.

This invention is a new process for making a new multifocal ophthalmic lens of the type known as "no jump" multifocal lens, wherein the image does not suddenly change direction as the eye passes from one specific visual portion to another across a certain point in their common junction. Said new multifocal lens is the subject of an application for Letters Patent filed by me on the 2nd day of December, 1926, Serial No. 152,102.

Said new multifocal lens has a distance visual portion and a reading visual portion meeting at a junction and elsewhere said visual portions are separated by an intermediary portion of different focal power. This last portion is of such size, power and inclination as to tilt the visual portion contained in it relative to the visual portion abutting thereto so as to eliminate the positional jump of the image across a point at the junction of said two visual portions. Said lateral intermediary areas or portions are located below the geometrical center of the lens; and the dividing lines of joinder of said variously powered portions curve in the same general direction, but are preferably down-curved.

The invention in the method of making said new multifocal lens consists broadly in concentrically grinding two areas on one piece of glass to make a saucer-like blank, said areas having the focal power desired for the reading visual portion and the intermediary portion or portions; then grinding away the intermediary portion of said saucer-like blank on an axis decentered appreciably, so as to produce a substantially crescent-shaped portion or surface surrounding the other two portions of the blank, the side of said newly ground portion coming down to and contacting with the reading visual portion at one side thereof. This newly ground visual portion is so curved as to make it a distance portion.

The full nature of the invention will be understood from the accompanying drawings and the following description and claims:

In the drawings, Figure 1 is a plan view of said new multifocal lens blank, the dotted line being the outline of the lens to be cut therefrom and finished. Fig. 2 is a cross section of said lens blank on the line 2—2 of Fig. 1. Fig. 3 is a target blank produced in the process of making said lens blank and having two concentric portions or surfaces. Fig. 4 is the same as Fig. 3 after a third eccentric surface had been generated on said target blank, the outline of the lens blank and of the finished lens being shown by dotted lines. Fig. 5 is a graphical layout of said lens blank, the saucer-shaped blank being shown in central vertical section. Fig. 6 is a central vertical section through means for grinding said third visual surface on the saucer-shaped lens blank, parts being broken away, and the parts shown at the beginning of the grinding operation. Fig. 7 is a similar view showing the parts at the end of the grinding operation.

The lens and lens blank are ground in one piece of glass, one side being provided with multi-curved surfaces and the opposite or prescription side with a single curved surface. The lens blank 10, shown in Fig. 1, has a distance visual portion 11, a reading visual portion 12, and intermediary portions 13. The dividing lines 14 and 15 between said portions of the lens blank are downwardly curved and, therefore, curved in substantially similar directions. All of the portions or surfaces of said lens blank preferably merge smoothly at the lines of joinder, without any ridge or shoulder, so as to be substantially invisible when worn. The lower central portion or field 12 is empowered for reading vision, the upper portion 11 for distance vision and the intermediary portion 13, which partially surrounds the reading portion, is of higher surface power than either the distance or the reading portions.

The distance and reading visual portions are in junction at 26 in the vertical meridian of the lens and this junction separates the intermediary portions which lie at the two sides of the junction.

In the design of this lens I find that in order to remove the image jump across the junction 26 of the distance and reading areas in the vertical meridian of the lens, it is necessary that the sizes and the powers of the various portions of the lens be so related with respect to each other, that the difference of dioptral power between the intermediary portion and the distance portion multiplied by the diameter of the dividing line circle therebetween shall be mathematically equal to the difference of dioptral power between the intermediary portion and the reading portion multiplied by the diameter of the dividing line circle therebetween. When this condition is satisfied, the image jump is removed, as above stated, regardless of what curves are ground on the other side of the lens.

The process of making this lens includes the following steps. The first step consists of concentrically grinding on one side of a relatively large piece of glass 150 two surfaces of different dioptral powers, a central surface 12 for making the reading portion of the lens, and a surrounding surface 13 having the curvature of the proposed intermediary portion. The resulting blank is saucer-shaped and is usually called a "target" blank. The blank 150 is usually molded to be substantially saucer-shaped, but the surfaces may be flat, if desired.

The second step in the process is to take said saucer-shaped blank 150, as shown in Fig. 3, and grind away a portion of the surface 13 thereof so as to generate the surface 11, as shown in Fig. 4, and having a curvature suitable for the distance visual portion of the finished lens and yet so tilt said distance surface with reference to the other surfaces of the lens as to smoothly merge therewith at the lines of joinder. The surface 11 added by this last step in the process produces on the saucer-shaped blank 150 a substantially crescent-shaped surface, as seen in Fig. 4, with the widest portion extending from the margin of the blank 150 to the junction 26 of the reading portion 12, with the distance portion 11.

Therefore, said surface 11 is ground about a different axis from that of the other two surfaces 12 and 13. Thus in Fig. 3, the grinding axes of surfaces 12 and 13 pass through a center 60, whereas the grinding axis of surface 11 passes through a variable center 61, as shown in Fig. 4. Hence, said surface 11 is decentered with respect to the other surfaces. These various surfaces have preferably different curvatures as for instance the reading portion 12 may have a curvature of five-and-one-half diopters, the intermediary portion 13 a curvature of eight diopters, and the distance portion 11 a curvature of six-and-one-half diopters.

In Fig. 6 means and methods are illustrated for carrying out the foregoing step of the process for generating said distance visual surface. There is a "cat head" or grinding tool 70 having a grinding surface of a single curvature as determined from the previously stated mathematical condition, say 6.50 diopters, and it has a spindle 71 whereby it is rotated. The lens blank 150 is applied to the tool by means of a lens holder 72 having a socket 73 adapted to be secured on a head 74 decentered on a rotary spindle 75, as shown in Fig. 6. The dotted line 76 indicates the original axis of the lens holder and lens and the dotted line 77 indicates the decentered axis. Both the grinding tool and the lens holder rotate on their axes during the grinding operation and since the curvature of the grinder has a greater radius than the curvature of the surface 13 previously generated on the blank 150, as shown in Fig. 3, the lens will at the beginning touch the grinder only at the upper margin, as shown in Fig. 6, and as the grinding proceeds, it will grind down the portion of the lens which touches the upper part of the grinding tool and in the form herein shown this will continue until the part thus ground away touches the reading portion 12 at the point 26, as seen in Fig. 4, and about that time the lower part of the grinding tool is engaged by the lens blank.

In the tool herein shown there is a peripheral recess 78 for the purpose of separating the upper surface of the tool from the portion that might engage the reading portion 12 of the lens, so as to avoid grinding that portion and reducing the danger of scratches thereon. This latter danger is further reduced by the use of suitable protecting coatings, such as shellac, sealing wax or Canada balsam.

The shifting of the axis of rotation of the lens blank from its original position 23 wherein the reading and intermediary surfaces of the lens are ground, to a new axis 24 wherein the distance surface is ground, may be done by angling or decentering such that the center of curvature of the distance surface will lie upon a line connecting the junction 26 of the distance and reading surfaces with the center of curvature 20 of the reading surface, as shown in Fig. 5. This shifting of the grinding axis to produce the distance surface is preferably done by decentering it parallel to the original grinding axis as shown. The amount of decentration is mathematically equal to the half-diameter of the reading portion less the ratio of the dioptral powers of the reading and distance surfaces multiplied by said half-diameter of the reading portion. This relation is obtained from the proportion of similar triangles, in Fig. 5.

For example, let us grind a disk having a center or reading portion of surface power of 5.50 diopters and diameter of 22 mm. and a peripheral or intermediary power of 8.00 diopters. Let us choose a distance surface power of 6.50 diopters, thereby giving a reading addition of one diopter. By our equation previously considered, when the jump is eliminated across the joinder of the reading and distance areas, the zonal area will have a final diameter of 36.6 mms. To grind this area we must decenter our new grinding axis 1.77 mms. from the old one, according to our second relation previously given.

The next step is to polish the various surfaces of the lens. This may be done by ordinary methods, but it is found best in polishing the distance surface, to rotate the lens around a decentered axis and to use a sharp edged pitch ring which has the property of fitting any spherical surface.

After the saucer-shaped lens blank has been finished on the multifocal side, the blank 10 is cut out thereof as indicated in Fig. 4 and shown in Figs. 1 and 2. The lens blank 10 is furnished to opticians who, after they receive the same, grind the prescription side or opposite side of the lens according to the desired prescription and so as to properly locate the optical centers of the lens. The edges are then broken away and removed until the finished form of the lens is attained, as shown by the dotted lines in Fig. 1, when it is edged and the lens is then ready for use.

It will thus be seen that the distance and reading areas at their junction 26 have a common radial axis and that, therefore, any jump in the position of the image across said boundary is eliminated at that junction since a ray of light is undeviated by refraction at a surface as long as it moves along a radius to that surface. Also the various surfaces merge into each other smoothly and are, therefore, free from any shoulder or projection hence are relatively invisible when in use. The lines of joinder preferably extend in substantially similar directions i. e. both upward or downward. As herein shown, both are curved downwardly, but that although preferable is unnecessary.

By this process I, therefore, have provided a multifocal lens which substantially possesses the invisibility of dividing line essential in high grade lenses; freedom from positional jump of the image across the boundary of the upper and lower areas; freedom from objectionable prismatic effects; freedom from annoying color fringes; and enabling freedom from the astigmatism of oblique pencils of rays.

The invention claimed is:

1. The process of making a multifocal lens, which process includes securing a lens blank on a lens blank holder, concentrically grinding said lens blank to form surfaces having the desired curvatures for the reading and intermediary portions of the ultimate lens, altering the axis of said lens blank holder by a predetermined amount, and grinding away a portion of the intermediary surface by rotation about the altered axis of the lens holder to form a surface whose curvature is suitable for distance vision.

2. The process of making a multifocal lens, which process includes securing a lens blank on a lens blank holder, concentrically grinding said lens blank to form surfaces having the desired curvatures for the reading and intermediary portions of the ultimate lens, altering the axis of said lens blank holder by a predetermined amount by means attached to said lens blank holder, whereby the previously ground lens blank surfaces are presented nonradially to the said lens blank holder axis, and grinding away a portion of the intermediary surface by rotation about the altered axis of the lens blank holder to form a surface whose curvature is suitable for distance vision, meeting the intermediary and reading portions in a common junction.

3. The process of making a multifocal lens, which process includes securing a lens blank on a lens blank holder, concentrically grinding said lens blank to form surfaces having the desired curvatures for the reading and intermediary portions of the ultimate lens, altering the axis of said lens blank holder by a predetermined amount by means attached thereto, whereby the previously ground lens blank surfaces are presented nonradially to the said lens blank holder axis, and grinding away a portion of the intermediary surface by rotation about the altered axis of the lens blank holder to form a surface whose curvature is suitable for distance vision, meeting the intermediary and reading portions in a common junction, whereby said distance and reading surfaces thus produced are so tilted relative to each other as to have a common radial axis at said common junction.

In witness whereof, I have hereunto affixed my signature.

LUCIAN W. BUGBEE, Jr.